(12) United States Patent
Vedage et al.

(10) Patent No.: US 8,318,309 B2
(45) Date of Patent: *Nov. 27, 2012

(54) BENZYLATED AMINOPROPYLATED ALKYLENEDIAMINES AND USES THEREOF

(75) Inventors: Gamini Ananda Vedage, Bethlehem, PA (US); Williams Rene Edouard Raymond, New Tripoli, PA (US); Michael Ian Cook, DeMeern (NL); Robert Marjo Theodoor Rasing, Didam (NL); Ellen Margaret O'Connell, Orefield, PA (US); Maw Lin Foo, Breinigsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 362 days.

This patent is subject to a terminal disclaimer.

(21) Appl. No.: 12/186,568

(22) Filed: Aug. 6, 2008

(65) Prior Publication Data

US 2009/0030125 A1 Jan. 29, 2009

Related U.S. Application Data

(63) Continuation-in-part of application No. 11/672,298, filed on Feb. 7, 2007, now Pat. No. 8,143,331.

(51) Int. Cl.
- *B32B 27/38* (2006.01)
- *C08L 79/02* (2006.01)
- *C08G 59/50* (2006.01)
- *C08L 63/00* (2006.01)

(52) U.S. Cl. ......... 428/413; 528/418; 528/421; 528/422

(58) Field of Classification Search .................. None
See application file for complete search history.

(56) References Cited

U.S. PATENT DOCUMENTS

| | | | |
|---|---|---|---|
| 2,589,245 A | 3/1952 | Greenlee | |
| 2,813,773 A | 11/1957 | Eisele et al. | |
| 2,921,037 A | 1/1960 | Karlheinz et al. | |
| 3,280,043 A | 10/1966 | Larson et al. | |
| 3,297,519 A | 1/1967 | Rambosek | |
| 3,321,438 A | 5/1967 | Brooker et al. | |
| 3,519,582 A | 7/1970 | Clelford et al. | |
| 3,763,102 A | 10/1973 | Hoffmann et al. | |
| 4,195,152 A | 3/1980 | Floyd | |
| 4,197,389 A | 4/1980 | Becker et al. | |
| 4,268,656 A | 5/1981 | Ray-Chaudhuri et al. | |
| 5,032,629 A | 7/1991 | Hansen et al. | |
| 5,059,391 A * | 10/1991 | Botta et al. ........................ | 422/7 |
| 5,280,091 A | 1/1994 | Dubowik et al. | |
| 5,587,409 A | 12/1996 | Dreischhoff et al. | |
| 5,618,905 A | 4/1997 | Marsella et al. | |
| 5,739,209 A | 4/1998 | Lassila et al. | |
| 6,573,357 B1 | 6/2003 | Ye et al. | |
| 2006/0194062 A1* | 8/2006 | Setiabudi et al. ............. | 428/413 |
| 2007/0073009 A1 | 3/2007 | Sabbadini et al. | |
| 2008/0114094 A1 | 5/2008 | Shah et al. | |
| 2008/0188591 A1* | 8/2008 | Raymond et al. ............. | 523/416 |
| 2008/0255271 A1 | 10/2008 | Raymond | |
| 2009/0023846 A1* | 1/2009 | Vedage et al. ................. | 524/186 |
| 2009/0030125 A1 | 1/2009 | Vedage et al. | |
| 2009/0030159 A1 | 1/2009 | Vedage et al. | |
| 2009/0163676 A1* | 6/2009 | Vedage et al. ................. | 525/504 |
| 2011/0095453 A1 | 4/2011 | Ogawa et al. | |

FOREIGN PATENT DOCUMENTS

| | | |
|---|---|---|
| DE | 24 60 305 A1 | 7/1976 |
| DE | 26 51 760 A1 | 5/1977 |
| DE | 28 53 752 A1 | 10/1979 |
| DE | 215 071 B | 10/1984 |
| DE | 198 48 113 C2 | 8/2001 |
| EP | 0 644 215 A | 3/1995 |
| EP | 0 737 702 A2 | 10/1996 |
| EP | 0 767 189 A2 | 4/1997 |
| EP | 0921146 A1 | 6/1999 |
| EP | 0 737 702 B1 | 8/2003 |
| EP | 1 433 775 A2 | 6/2004 |
| EP | 1 454 935 A1 | 9/2004 |
| EP | 1 679 329 A1 | 7/2006 |
| EP | 1865013 A1 | 12/2007 |
| EP | 1956034 A1 | 8/2008 |
| EP | 2157112 A2 | 2/2010 |
| FR | 901 921 A | 8/1945 |
| GB | 1 410 111 | 10/1975 |
| GB | 2 015 000 A | 9/1979 |
| IN | 166475 | 5/1990 |
| JP | 02239139 A * | 9/1990 |
| JP | 03-287678 | 12/1991 |
| JP | 2007-277401 | 10/2007 |
| JP | 2008-169376 | 7/2008 |
| JP | 2010-006991 | 1/2010 |
| WO | 2004/049776 A2 | 6/2004 |
| WO | 2007/070877 | 6/2007 |

OTHER PUBLICATIONS

Tanaka, Y., Synthesis and Characteristics of Epoxides, C. A., May ed., Epoxy Resins Chemistry and Technology, pp. 213-233, Marcel Dekker, 1988.

Bernardo, M. Alexandra, et al., Thermodynamic and Steady-State Fluorescence Emission Studies on Metal Complexes of Receptors Containing Benzene Subunits, Inorganic Chemistry, 1998, pp. 3935-3942, vol. 37 (16), American Chemical Society.

Bernardo, M. Alexandra, et al., Thermodynamic, NMR and Photochemical Study on the Acid-Base Behaviour of N,N'-dibenzylated Polyamines and on Their Interaction With Hexacyanocobaltate(III), Journal of the Chemical Society, Perkin Transactions 2: Physical Organic Chemistry, 1996, pp. 2335-2342, vol. 11, Royal Society of Chemistry.

Rehse, Klaus et al., Alkyl-und Arylalkylderivate von Putrescin, Spermidin und Spermin, Archiv der Pharmazie, 1990, pp. 287-294, vol. 3235, Weinheim.

Kroupa, J., et al.; "Use of H2N (CH2) 3N (R1R2)—Type Amines as Hardening Agents . . . "; Checky Prumysl; vol. 26 No. 9; 1976; pp. 477-480.

* cited by examiner

*Primary Examiner* — Michael J Feely

(74) *Attorney, Agent, or Firm* — Michael K. Boyer

(57) ABSTRACT

The present invention provides epoxy curing agent compositions comprising benzylated aminopropylated alkylenediamine compounds. Amine-epoxy compositions and articles produced from these amine-epoxy compositions are also disclosed.

27 Claims, No Drawings

BENZYLATED AMINOPROPYLATED ALKYLENEDIAMINES AND USES THEREOF

CROSS-REFERENCE TO RELATED APPLICATIONS

This application is a continuation-in-part of application Ser. No. 11/672,298 filed Feb. 7, 2007 (now U.S. Pat. No. 8,143,331), the disclosure of which is incorporated by reference herein.

BACKGROUND OF THE INVENTION

The present invention relates generally to benzylated aminopropylated alkylenediamine compounds, curing agent and amine-epoxy compositions derived from such compounds, and articles produced from such compounds and/or compositions.

The uses of epoxy resins which are cured, hardened, and/or crosslinked with amine-based curing agents are well known. These amine-epoxy materials are widely used in applications ranging from coatings, adhesives, and composites, to construction products for concrete, cementitious or ceramic substrates, often referred to as civil engineering applications such as formulations for concrete flooring.

When epoxy resins are cured with most pure non aromatic amines, the miscibility of these amines with the epoxy resins is not always good and some ripening time might be necessary before a clear mixture can be obtained.

In the case of a clear coat a ripening time may be applied to achieve a coating with high gloss and clarity. Ripening time or incubation time or induction time is defined as the time between mixing epoxy resin with amine and applying the product onto the target substrate. It could also be defined as the time required for the mix to become clear.

In order to overcome these problems the amines have been adducted with monoglycidyl ethers particularly the phenyl glycidyl ether or the o-cresyl glycidyl ether. These reactions are very advantageous to lower the vapor pressure and improve the miscibility of the amine to the resin, unfortunately this adduction tends to increase the viscosity to a very high level which can hinder the application of the product. This type of adduction might also require the removal of the free amine. Should the adduction be carried out far enough to remove all free amine the viscosity would become much too high and in some cases the product would even be solid. This type of adduction is also limited as each molecule used per molecule amine will remove a reactive site, which can diminish the cross-linking density of the systems particularly with amines having only four or less reactive sites.

There are numerous amine-based curing agent and amine-epoxy compositions that are employed in the amine-epoxy coating industry; however, none of these known products completely addresses the needs or solves the problems noted above. Accordingly, it is to this end that the present invention is directed.

BRIEF SUMMARY OF THE INVENTION

The present invention discloses curing agent compositions and methods of making such compositions. These curing agent compositions can be used to cure, harden, and/or crosslink an epoxy resin. The present invention comprises curing agent compositions comprising at least one benzylated aminopropylated alkylenediamine having at least three active amine hydrogen atoms and at least one benzyl group, which in one embodiment comprises the reaction product of the reductive amination of a benzaldehyde compound with an aminopropylated alkylenediamine (APADA). In another embodiment the at least one benzylated APADA comprises the reaction product of a benzyl halide with an APADA. In yet another embodiment the at least one benzylated APADA comprises at least one benzylated aminopropylated ethylenediamine.

In another aspect, the present invention provides a curing agent composition comprising the contact product of
 (i) at least one benzylated APADA, e.g., the reaction product of the reductive amination of a benzaldehyde compound with an APADA, the benzylated APADA having at least three active amine hydrogens and at least one benzyl group; and
 (ii) at least one multifunctional amine having three or more active amine hydrogens.

Generally, curing agent compositions of the present invention have an amine hydrogen equivalent weight (AHEW) based on 100% solids from about 30 to about 500.

The present invention, in yet another aspect, provides amine-epoxy compositions. For example, an amine-epoxy composition in accordance with the present invention comprises the reaction product of:
A) a curing agent composition comprising at least one benzylated APADA, e.g., the reaction product of the reductive amination of a benzaldehyde compound with an APADA, the benzylated APADA having at least one benzyl group and at least three active amine hydrogens; and
B) an epoxy composition comprising at least one multifunctional epoxy resin.

As another aspect in accordance with the present invention an amine-epoxy composition comprises the reaction product of:
A) a curing agent composition comprising the contact product of:
 (i) at least one benzylated APADA, e.g., the reaction product of the reductive amination of a benzaldehyde compound with an APADA, the benzylated APADA having at least one benzyl group and at least three active amine hydrogens; and
 (ii) at least one multifunctional amine having three or more active amine hydrogens; and
B) an epoxy composition comprising at least one multifunctional epoxy resin.

In a particular embodiment of each of the above aspects the benzylated APADA is a benzylated aminopropylated ethylenediamine (APEDA). In another particular embodiment of each of the above aspects the benzylated APADA is a benzylated N,N'-bis(3-aminopropyl)ethylenediamine. In yet another particular embodiment of each of the above aspects the benzylated APADA is a benzylated APEDA mixture comprising benzylated N-3-aminopropyl ethylenediamine; benzylated N,N'-bis(3-aminopropyl)ethylenediamine; and benzylated N,N,N'-tris(3-aminopropyl)ethylenediamine.

In each aspect and embodiment of the invention the curing agent composition may comprise a benzylated APADA component comprising polyamine molecules having one, or two, or three, or four aminopropyl groups, or any combination thereof. In each aspect and embodiment of the invention such benzylated APADA component may comprise benzylated APADAs having at least two aminopropyl groups, i.e., having two or more aminopropyl groups, especially those benzylated APADAs having two aminopropyl groups.

Articles of manufacture produced from amine-epoxy compositions disclosed herein include, but are not limited to, adhesives, coatings, primers, sealants, curing compounds, construction products, flooring products, and composite products. Further, such coatings, primers, sealants, or curing compounds can be applied to metal or cementitious substrates.

When the aminopropylated ethylenediamine (APEDA) is benzylated, particularly when a mixture of N-3-aminopropyl ethylenediamine (Am3); N,N'-bis(3-aminopropyl)ethylenediamine (Am4); and N,N,N'-tris(3-aminopropyl)ethylenediamine (Am5) is benzylated, the resultant product has a better compatibility with epoxy resin, particularly with most common epoxy resins based on bisphenol A or bisphenol F as well as polyepoxy novolac resins. The mix of curing agent and epoxy resin often requires no "ripening time" for obtaining contact products with high gloss and clarity. Also smoking or fuming may be decreased or eliminated. Furthermore, the reaction products following reductive benzylation have a lower viscosity which allows benzylation to a point where no free amine is present in the final product. The removal of the free amine helps in reducing the carbamation of the film caused by the reaction of the primary amine in the presence of water and carbon dioxide. The decrease/absence of smoking or fuming; the improved compatibility with epoxy resin; the lower tendency to carbamate; the reduced need for an induction time and the low level of free, unreacted amine in the final product result in improved handling properties.

DEFINITIONS

The following definitions and abbreviations are provided in order to aid those skilled in the art in understanding the detailed description of the present invention.
ADA—alkylenediamine, includes but is not limited to EDA and PDA
AHEW—amine hydrogen equivalent weight
Am3—N-3-aminopropyl ethylenediamine
Am4—N,N'-bis(3-aminopropyl)ethylenediamine
Am5—N,N,N'-tris(3-aminopropyl)ethylenediamine
Am3-Am5—mixture of Am3, Am4 and Am5
APADA—aminopropylated alkylenediamine, includes but is not limited to APEDA and APPDA
APEDA—aminopropylated ethylenediamine
APPDA—aminopropylated propylenediamine
D230—poly(alkylene oxide) from Huntsman Corp
DETA—diethylenetriamine, AHEW=21
DGEBA—diglycidyl ether of bisphenol-A, EEW 182-192
DER™ 331—Liquid DGEBA
EDA—ethylenediamine
EEW—epoxy equivalent weight
Epikote® 828 (Epon 828)—liquid epoxy resin with EEW approximately 184-192
IPDA—isophoronediamine, AHEW=43
PDA—propylenediamine
PEHA—pentaethylenehexamine
PHR—parts per hundred weight resin
TEPA—tetraethylenepentamine
TETA—triethylenetetramine, AHEW=25

DETAILED DESCRIPTION OF THE INVENTION

Amine Curing Agent and Epoxy-Amine Compositions

The present invention discloses curing agent compositions and methods of making these curing agent compositions. A curing agent composition in accordance with the present invention can be used to cure, harden, and/or crosslink an epoxy resin. Such curing agent composition comprises a benzylated APADA component comprising at least one benzylated APADA, such as, the reductive amination product of a benzaldehyde compound with an APADA. The preferred embodiment comprises a benzylated APEDA. The degree of benzylation depends on the equivalents ratio of benzaldehyde compound to reactive amine hydrogens in the APADA in the reductive amination reaction. Thus, in one aspect of the invention, the curing agent composition comprises a benzylated APADA component comprising polyamine molecules having one, or two, or three, or four or more benzyl groups, or any combination thereof. In another aspect such benzylated APADA component for the present invention comprises at least 20 wt % benzylated APADAs having at least two benzyl groups, i.e., having two or more benzyl groups. In other aspects of the invention the benzylated APADA component comprises 20 to 100 wt %, especially 30 to 95 wt % and desirably 40 to 90 wt %, benzylated APADAs having at least two benzyl groups. Generally, this curing agent composition has an amine hydrogen equivalent weight (AHEW) based on 100% solids from about 30 to about 500. In a different aspect, the curing agent composition has an AHEW based on 100% solids from about 60 to about 400, or from about 80 to about 300. Further, the curing agent composition can have an AHEW based on 100% solids from about 50 to about 100. In these aspects, the preferred embodiment comprises a benzylated APEDA composition.

In another aspect, the present invention provides a curing agent composition comprising the contact product of
(i) a benzylated APADA component comprising at least one benzylated APADA, e.g., the reductive amination product of a benzaldehyde compound with an APADA, the benzylated APADA having at least one benzyl group and at least three active amine hydrogens; and
(ii) at least one multifunctional amine having 3 or more active amine hydrogens.

Again in another embodiment of this aspect of the invention, the curing agent composition comprises a benzylated APADA component comprising polyamine molecules having one, or two, or three, or four or more benzyl groups, or any combination thereof. In one aspect such benzylated APADA component for the present invention comprises at least 20 wt % benzylated APADAs having at least two benzyl groups, i.e., having two or more benzyl groups. In other aspects the benzylated APADA component comprises 20 to 100 wt %, especially 30 to 95 wt %, desirably 40 to 90 wt %, benzylated APADAs having at least two benzyl groups. The curing agent composition in this aspect of the present invention can have an AHEW based on 100% solids from about 30 to about 500. Further, such curing agent composition can have an AHEW based on 100% solids in the range from about 55 to about 450, from about 60 to about 400, from about 70 to about 350, from about 80 to about 300, or from about 90 to about 250. In a different aspect, the curing agent composition has an AHEW based on 100% solids from about 100 to about 200. In these aspects, the preferred embodiment comprises a benzylated APEDA composition.

If the multifunctional amine is different from the benzylated APADA, AHEW can be calculated based on its chemical structure, or is often provided by the supplier of the amine in case of a mixture. The AHEW for the benzylated APADA compound, $AHEW_B$, is determined using the following formula, assuming the APADA is the reductive amination product of x moles of benzaldehyde, for example, with 1 mole of a APADA compound, PAPA (the APADA compound and the benzaldehyde are discussed in greater detail below):

$$AHEW_B = \frac{MW_{PAPA} + x \cdot (MW_{Ald/Ket} - 16)}{f - x};$$

wherein:
$MW_{PAPA}$ is the average molecular weight of the APADA;
$MW_{Ald/Ket}$ is the molecular weight of the benzaldehyde;
f is the average amine hydrogen functionality of the APADA; and
$MW_{APAPA}$ is the average molecular weight of the benzylated APADA and can be calculated as follows:

$$MW_{APAPA} = MW_{PAPA} + x \cdot (MW_{Ald/Ket} - 16).$$

In each of the above aspects of the invention the curing agent composition comprises a benzylated APADA component comprising polyamine molecules having one, or two, or three, or four or more alkyl groups or any combination thereof. Such benzylated APADA component for the present invention comprises at least 20 wt % benzylated APADAs having two or more benzyl groups, preferably 20 to 100 wt %, especially 30 to 95 wt %, and desirably 40 to 90 wt %, APADAs having two or more benzyl groups.

Additionally, curing agent compositions described herein can be solvent-based. Alternatively, in another aspect of the present invention, these compositions can further comprise at least one diluent, such as, for example, an organic solvent, or an organic or inorganic acid. Appropriate organic solvents are well known to those skilled in the art of amine formulation chemistry. Exemplary organic solvents suitable for use in the present invention include, but are not limited to, benzyl alcohol, butanol, toluene, xylene, methyl ethyl ketone, and the like, or combinations thereof. Non-limiting examples of organic and inorganic acids are acetic acid, sulfamic acid, lactic acid, salicylic acid, sebacic acid, boric acid, phosphoric acid, and the like, or combinations thereof. Such acids can increase the curing speed of the curing agent composition.

Curing agent compositions of the present invention can be produced with various reactant ratios of benzaldehyde compound to the APADA compound.

In accordance with the present invention, a method of making a curing agent composition is provided. This method comprises either using the benzylated APADA composition as a curing agent or formulating it with other amine curing agents, such as alkylated amines or non-alkylated amines, catalysts, accelerators, non-reactive diluents, solvents and other additives necessary to achieve the required properties of the final curing agent composition.

Curing agent compositions described herein can maintain single phase uniformity for extended periods of time, which can be required for storage of the product and its subsequent use in its intended application. Additionally, if these compositions are substantially free of solvents, they can have substantially no VOCs, which can be beneficial for environmental, health and safety issues, as will be appreciated by those skilled in the art.

The curing agent compositions also can be further modified with monofunctional epoxides, such as, for example, phenyl glycidyl ether, o-cresyl glycidyl ether, p-tert-butylphenyl glycidyl ether, n-butyl glycidyl ether, and other similar glycidyl ethers or esters. Further, curing agent compositions disclosed herein can be blended with other commercially available curing agents. Such commercially available curing agents include, but are not limited to, solvent based, solvent free or water-based curing agents, which can be employed in a blend to target specific properties, such as cure rate, drying speed, hardness development, clarity, and gloss.

The present invention also includes articles of manufacture comprising an amine-epoxy composition as described above. Such articles can include, but are not limited to, an adhesive, a coating, a primer, a sealant, a curing compound, a construction product, a flooring product, a composite product, laminate, potting compounds, grouts, fillers, cementitious grouts, or self-leveling flooring. Additional components or additives can be used together with the compositions of the present invention to produce articles of manufacture. Further, such coatings, primers, sealants, curing compounds or grouts can be applied to metal or cementitious substrates.

The relative amount chosen for the epoxy composition versus that of the curing agent composition, or hardener, can vary depending upon, for example, the end-use article, its desired properties, and the fabrication method and conditions used to produce the end-use article. For instance, in coating applications using certain amine-epoxy compositions, incorporating more epoxy resin relative to the amount of the curing agent composition can result in coatings which have increased drying time, but with increased hardness and improved appearance as measured by gloss. Amine-epoxy compositions of the present invention generally have stoichiometric ratios of epoxy groups in the epoxy composition to amine hydrogens in the curing agent composition ranging from about 1.5:1 to about 0.7:1. For example, such amine-epoxy compositions can have stoichiometric ratios of about 1.5:1, about 1.4:1, about 1.3:1, about 1.2:1, about 1.1:1, about 1:1, about 0.9:1, about 0.8:1, or about 0.7:1. In another aspect, the stoichiometric ratio ranges from about 1.3:1 to about 0.7:1. In yet another aspect, the stoichiometric ratio ranges from about 1.2:1 to about 0.8:1. In still another aspect, the stoichiometric ratio ranges from about 1.1:1 to about 0.9:1.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions or formulations described herein. Still further, two or more of the components of the contact product may react to form other components composing the composition. Combining additional materials or components can be done by any method known to one of skill in the art.

Benzylated Aminopropylated Alkylenediamines

The alkylenediamine compounds that are useful in producing the APADA compounds used in the present invention include, but are not limited to, the EDA, PDA, butylenediamine, pentamethylenediamine, and hexamethylenediamine compounds. Aminopropylated ethylenediamines (APEDAs) and aminopropylated propylenediamines (APPDAs) include, but are not limited to, N-3-aminopropyl ethylenediamine (Am3); N,N'-bis(3-aminopropyl)ethylenediamine (Am4); N,N-bis(3-aminopropyl)ethylenediamine; N,N,N'-tris(3-aminopropyl)ethylenediamine (Am5); N,N,N',N'-tetrakis(3-aminopropyl)ethylenediamine; N-3-aminopropyl-1,3-diaminopropane; N,N'-bis(3-aminopropyl)-1,3-diaminopropane; N,N-bis(3-aminopropyl)-1,3-diaminopropane; N,N,N'-tris(3-aminopropyl)-1,3-diaminopropane; N,N,N',N'-tetrakis(3-aminopropyl)-1,3-diaminopropane; and aminopropylated higher alkylenediamines. Mixtures of APADA compounds can be employed in the present invention.

The APADA compounds are prepared by the Michael reaction of an alkylenediamine, such as ethylenediamine or 1,3-diaminopropane, with acrylonitrile, followed by hydrogenation over metal catalysts as is well known to those skilled in the art. For example, see Example 1 of US-2008-0114094-A1 published 15 May 2008, the disclosure of which is incorporated by reference. This Example 1 shows the synthesis of a Am3-Am5 mixture comprising 6 wt % Am3, 80 wt % Am4, 11 wt % Am5, 2 wt % N,N,N',N'-tetrakis(3-aminopropyl)ethylenediamine and 1 wt % other components.

An APEDA component for use in the benzylation reaction comprises N,N'-bis(3-amino-propyl)ethylenediamine (Am4). In another embodiment the APEDA component comprises an Am3-Am5 mixture comprising 0-20 pbw of N-3-aminopropyl ethylenediamine (Am3), 60-95 pbw of N,N'-bis(3-aminopropyl)ethylenediamine (Am4), 0-20 pbw of N,N,N'-tris(3-aminopropyl)ethylenediamine (Am5). The Am3-Am5 mixture may also comprise 0-10 pbw of N,N,N',N'-tetrakis(3-aminopropyl)ethylenediamine. In an aspect of this embodiment the mixture may comprise 70-90 pbw of N,N'-bis(3-aminopropyl)ethylenediamine (Am4).

In yet another embodiment of the invention, the APEDA component for use in the benzylation reaction comprises an Am3-Am5 mixture comprising 1 to 15 pbw N-3-aminopropyl ethylenediamine (Am3), 60 to 95 pbw N,N'-bis(3-aminopropyl)ethylenediamine (Am4) and 2 to 25 pbw N,N,N'-tris(3-aminopropyl)ethylenediamine (Am5). In a further embodiment the APEDA component for use in the benzylation reaction comprises an Am3-Am5 mixture comprising 2 to 8 pbw N-3-aminopropyl ethylenediamine (Am3), 65 to 90 pbw N,N'-bis(3-aminopropyl)ethylenediamine (Am4), and 5 to 15 pbw N,N,N'-tris(3-aminopropyl)ethylenediamine (Am5). In another aspect of these embodiments of the invention the APEDA component may comprise 70-90 pbw N,N'-bis(3-aminopropyl)ethylenediamine (Am4). In another aspect of these embodiments the mixture may further comprise 75-85 pbw of N,N'-bis(3-aminopropyl)ethylenediamine. (Am4)

Such mixtures composing the APEDA component can be prepared by the reaction sequence described above for making the APADA without the need to conduct a distillation or other process of separation, except for the optional removal of low molecular weight side products of the reaction which are more volatile than N-3-aminopropyl ethylenediamine (Am3). It will be recognized by those skilled in the art that small quantities of other products of hydrogenation may be present in the mixture.

Benzaldehyde compounds useful in the reductive amination reaction comprise unsubstituted benzaldehyde and substituted benzaldehydes. Substituted benzaldehydes include, but are not limited to, compounds of the formula PhCHO in which the aromatic ring Ph is substituted with one or more of halogen atoms, C1-C4 alkyl, methoxy, ethoxy, amino, hydroxyl or cyano groups. In one aspect the benzaldehyde compound is desirably benzaldehyde and in another aspect it is vanillin.

In one aspect of the present invention, the at least one benzylated APADA comprises the reductive amination product of a benzaldehyde compound with an APADA, especially with an APEDA.

In accordance with the curing agent compositions and methods of making such compositions disclosed herein, the molar reactant ratio of the benzaldehyde compound to the at least one APADA compound is in a range from about 0.8:1 to about 3.0:1. In another aspect, the molar reactant ratio is about 0.9:1, about 1:1, about 1.1:1, about 1.2:1, about 1.3:1, about 1.4:1, about 1.5:1, about 1.6:1, about 1.7:1, about 1.8:1, about 1.9:1, or about 2.0:1. In yet another aspect, the molar reactant ratio is in a range from about 0.9:1 to about 1.8:1, or from about 1:1 to about 1.6:1. In a further aspect, the molar reactant ratio of the benzaldehyde compound to the at least one APADA compound is in a range from about 1.2:1 to about 1.5:1. In yet another aspect the product should retain more than two reactive amine hydrogens, to allow a proper cross-linking of the epoxy resin. Even at molar reactant ratios of the benzaldehyde compound to the at least one APADA compound less than 1:1, dibenzylated APADAs are produced albeit in minor amounts. However to afford sufficient amounts of dibenzylated APADAs, molar reactant ratios of the benzaldehyde compound to the at least one APADA compound of 1:1 to 2.2:1 should be used.

The benzylated APADAs of the present invention can be prepared by the reductive amination of at least one APADA compound with the benzaldehyde compound. Procedures for the reductive amination of benzaldehyde are well known to those of skill in the art. Generally, these procedures involve condensing the benzaldehyde with the amine, then reducing the intermediate Schiff base. The reduction is typically conducted in the presence of a metal catalyst in a hydrogen-rich atmosphere at pressures above atmospheric pressure. Non-limiting examples of the synthesis of benzylated APADA in accordance with the present invention are illustrated in Examples 2-3 that follow.

In another aspect of the present invention, the at least one benzylated APADA comprises the reaction product of a benzyl halide with the at least one APADA. The benzyl halide may be a fluoride, chloride, bromide or iodide. The benzyl group may comprise unsubstituted benzyl or a substituted benzyl group. Substituted benzyl groups include, but are not limited to, radicals of the formula PhCH2- in which the aromatic ring Ph is substituted with one or more of halogen atoms, C1-C4 alkyl, methoxy, ethoxy, amino, hydroxyl or cyano groups. In one aspect the benzyl group is desirably benzyl and in another aspect it is vanillyl.

The benzylated APADAs of the present invention can also be prepared by the reaction of at least one APADA compound with a benzyl halide. A non-limiting example of the synthesis of benzylated APADA which can be employed in the present invention is illustrated in Publication IN166475. According to Publication IN166475, benzyl chloride (3.627 L, 31.78 moles) was added in small portions to a cooled solution of anhydrous ethylenediamine (11.160 L, 167.77 moles) in absolute ethanol. This exemplary synthesis of a benzylated polyalkylene polyamine utilized a large molar excess of ethylenediamine. A large molar excess of one reactant is not required, but may be employed, in the practice of this invention. Generally, molar reactant ratios of the at least one benzyl halide compound to the at least one APADA compound are within a range from about 0.8:1 to about 2:1. In another aspect, the molar reactant ratio is about 0.9:1, about 1:1, about 1.1:1, about 1.2:1, about 1.3:1, about 1.4:1, about 1.5:1, about 1.6:1, about 1.7:1, about 1.8:1, or about 1.9:1. Yet, in another aspect, the molar reactant ratio of the at least one benzyl halide to the at least one APADA compound is in a range from about 1.2:1 to about 1.5:1. Additionally, those of ordinary skill in the art in the field of this invention readily recognize that other APADA and benzyl halides, respectively, can be substituted into this general reaction scheme under like conditions and produce additional benzylated APADA compounds.

In another aspect of this invention, the at least one benzylated APADA compound has the formula

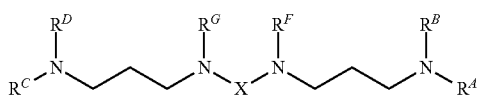

wherein $R^A$ is a substituted or unsubstituted benzyl group; $R^B$, $R^C$, $R^D$, $R^F$, and $R^G$ are independently $R^A$ or a hydrogen atom; X is a C2-C6 alkylene group, provided that the benzylated APADA has at least three active amine hydrogen atoms. In another aspect, $R^A$ and $R^C$ are preferably benzyl or vanillyl, especially benzyl. In a desired embodiment of both of these aspects X is ethylene.

In yet another aspect of the present invention, the benzylated APADA compound is of the above formula, wherein $R^A$ is benzyl or vanillyl; $R^B$, $R^C$, $R^D$, $R^F$, and $R^G$ are hydrogen atoms. In a further aspect, $R^A$ and $R^C$ are benzyl or vanillyl, especially benzyl, and $R^B$, $R^D$, $R^F$, and $R^G$ are hydrogen atoms. In a desired embodiment of these aspects X is ethylene.

Given the many possible locations on the APADA compound where the benzyl groups can replace a hydrogen atom, the product resulting from the reductive reaction of at least one APADA compound and a benzaldehyde compound or from the reaction with a benzyl halide is necessarily a mixture of many different species, where some of the $R^B$, $R^C$, $R^D$, $R^F$, and $R^G$ groups are hydrogen and others are benzyl groups. Which and how many of the "R" groups are converted from hydrogen to benzyl groups depends on many factors, among those being the reaction conditions, catalyst selection, reactants ratio, choice of reactant (specific halide compound or benzaldehyde compound), and the like. For example, using a benzaldehyde compound as the reactant in a molar reactant ratio of benzaldehyde to the APADA compound of between about 1:1 to about 2:1, the major component of the reaction product is where $R^A$ is benzyl, $R^C$ is benzyl or a hydrogen atom, and $R^B$, $R^D$, $R^F$, and $R^G$ are hydrogen atoms. Using a benzaldehyde compound as the reactant in a molar reactant ratio of benzaldehyde to the APADA compound of about 1.6:1 to about 2.1:1, the major component of the reaction product is where $R^A$ and $R^C$ are benzyl, and $R^B$, $R^D$, $R^F$, and $R^G$ are benzyl or hydrogen atoms.

Multifunctional Amine

Curing agent compositions in accordance with the present invention can comprise at least one multifunctional amine. Multifunctional amine, as used herein, describes compounds with amine functionality and which contain three (3) or more active amine hydrogens.

Non-limiting examples of multifunctional amines that are within the scope of the present invention include, but are not limited to, an aliphatic amine, a cycloaliphatic amine, an aromatic amine, a poly(alkylene oxide) diamine or triamine, a Mannich base derivative of an aliphatic amine, a cycloaliphatic amine, or an aromatic amine, a polyamide derivative of an aliphatic amine, a cycloaliphatic amine, or an aromatic amine with a dimer fatty acid or a mixture of a dimer fatty acid and fatty acid, an amidoamine derivative of an aliphatic amine, a cycloaliphatic amine, or an aromatic amine with a fatty acid, an amine adduct derivative of an aliphatic amine, a cycloaliphatic amine, or an aromatic amine with a glycidyl ether of bisphenol A or bisphenol F or an epoxy novolac resin, and the like, or any combination thereof.

More than one multifunctional amine can be used in the compositions of the present invention. For example, the at least one multifunctional amine can comprise an aliphatic amine and a Mannich base derivative of a cycloaliphatic amine. Also, the at least one multifunctional amine can comprise one aliphatic amine and one different aliphatic amine.

Exemplary aliphatic amines include polyethyleneamines (EDA, DETA, TETA, TEPA, PEHA, and the like), polypropyleneamines, aminopropylated ethylenediamines (Am3, Am4, Am5, and the like), aminopropylated propylenediamines, 1,6-hexanediamine, 3,3,5-trimethyl-1,6-hexanediamine, 3,5,5-trimethyl-1,6-hexanediamine, 2-methyl-1,5-pentanediamine, and the like, or combinations thereof. In one aspect of this invention, the at least one multifunctional amine is EDA, DETA, TETA, TEPA, PEHA, propylenediamine, dipropylenetriamine, tripropylenetetramine, Am3, Am4, Am5, N-3-aminopropyl-1,3-diaminopropane, N,N'-bis(3-aminopropyl)-1,3-diaminopropane, N,N,N'-tris(3-aminopropyl)-1,3-diaminopropane, or any combination thereof. Additionally, the poly(alkylene oxide) diamines and triamines commercially available under the Jeffamine trademark from Huntsman Corporation, are useful in the present invention. Illustrative examples include, but are not limited to, Jeffamine® D-230, Jeffamine® D-400, Jeffamine® D-2000, Jeffamine® D-4000, Jeffamine® T-403, Jeffamine® EDR-148, Jeffamine® EDR-192, Jeffamine® C-346, Jeffamine® ED-600, Jeffamine® ED-900, Jeffamine® ED-2001, and the like, or combinations thereof.

Cycloaliphatic and aromatic amines include, but are not limited to, 1,2-diaminocyclohexane, 1,3-diaminocyclohexane, 1,4-diaminocyclohexane, hydrogenated ortho-toluenediamine, hydrogenated meta-toluenediamine, metaxylylene diamine, hydrogenated metaxylylene diamine (referred to commercially as 1,3-BAC), isophorone diamine, norbornane diamines, 3,3'-dimethyl-4,4'-diaminodicyclohexyl methane, 4,4'-diaminodicyclohexyl methane, 2,4'-diaminodicyclohexyl methane, a mixture of methylene bridged poly(cyclohexyl-aromatic)amines, and the like, or combinations thereof. The mixture of methylene bridged poly(cyclohexyl-aromatic)amines is abbreviated as either MBPCAA or MPCA, and is described in U.S. Pat. No. 5,280,091, which is incorporated herein by reference in its entirety. In one aspect of the present invention, the at least one multifunctional amine is a mixture of methylene bridged poly(cyclohexyl-aromatic)amines (MPCA).

Mannich base derivatives can be made by the reaction of the above described aliphatic amines, cycloaliphatic amines, or aromatic amines with phenol or a substituted phenol and formaldehyde. An exemplary substituted phenol used to make Mannich bases with utility in the present invention is cardanol, which is obtained from cashew nut shell liquid. Alternatively, Mannich bases can be prepared by an exchange reaction of a multifunctional amine with a tertiary amine containing a Mannich base, such as tris-dimethylaminomethylphenol (commercially available as Ancamine® K54 from Air Products and Chemicals, Inc.) or bis-dimethylaminomethylphenol. Polyamide derivatives can be prepared by the reaction of an aliphatic amine, cycloaliphatic amine, or aromatic amine with dimer fatty acid, or mixtures of a dimer fatty acid and a fatty acid. Amidoamine derivatives can be prepared by the reaction of an aliphatic amine, cycloaliphatic amine, or aromatic amine with fatty acids. Amine adducts can be prepared by the reaction of an aliphatic amine, cycloaliphatic amine, or aromatic amine with an epoxy resin, for example, with the diglycidyl ether of bisphenol-A, the diglycidyl ether of bisphenol-F, or epoxy novolac resins. The aliphatic, cycloaliphatic, and aromatic amines also can be adducted with monofunctional epoxy resins, such as phenyl glycidyl ether, cresyl glycidyl ether, butyl glycidyl ether, other alkyl glycidyl ethers, and the like.

Multifunctional Epoxy Resin

Amine-epoxy compositions of the present invention comprise the reaction product of a curing agent composition and an epoxy composition comprising at least one multifunctional epoxy resin. Multifunctional epoxy resin, as used herein, describes compounds containing 2 or more 1,2-epoxy groups per molecule. Epoxide compounds of this type are well known to those of skill in the art and are described in Y. Tanaka, "Synthesis and Characteristics of Epoxides", in C. A. May, ed., *Epoxy Resins Chemistry and Technology* (Marcel Dekker, 1988), which is incorporated herein by reference.

One class of epoxy resins suitable for use in the present invention comprises the glycidyl ethers of polyhydric phenols, including the glycidyl ethers of dihydric phenols. Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (commercially known as bisphenol A), bis-(4-hydroxyphenyl)-methane (commercially known as bisphenol F, and which may contain varying amounts of 2-hydroxyphenyl isomers), and the like, or any combination thereof. Additionally, advanced dihydric phenols of the following structure also are useful in the present invention:

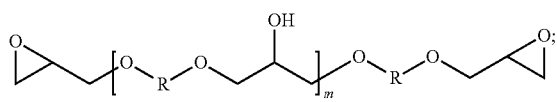

where m is an integer, and R is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present invention.

In another aspect, epoxy novolac resins, which are the glycidyl ethers of novolac resins, can be used as multifunctional epoxy resins in accordance with the present invention. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products ranges from about 450 to 3000 or more. Because these products are solid at room temperature, they are often referred to as solid epoxy resins.

DGEBA or advanced DGEBA resins are often used in coating formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of 174. Resins with EEW's between 250 and 450, also generally prepared by the advancement process, are referred to as semi-solid epoxy resins because they are a mixture of solid and liquid at room temperature. Generally, multifunctional resins with EEW's based on solids of about 160 to about 750 are useful in the prevent invention. In another aspect the multifunctional epoxy resin has an EEW in a range from about 170 to about 250.

Depending upon the end-use application, it can be beneficial to reduce the viscosity of the compositions of the present invention by modifying the epoxy component. For example, the viscosity can be reduced to allow an increase in the level of pigment in a formulation or composition while still permitting easy application, or to allow the use of a higher molecular weight epoxy resin. Thus, it is within the scope of the present invention for the epoxy component, which comprises at least one multifunctional epoxy resin, to further comprise a monofunctional epoxide. Examples of monoepoxides include, but are not limited to, styrene oxide, cyclohexene oxide, ethylene oxide, propylene oxide, butylene oxide, and the glycidyl ethers of phenol, cresols, tert-butylphenol, other alkyl phenols, butanol, 2-ethylhexanol, $C_4$ to $C_{14}$ alcohols, and the like, or combinations thereof. The multifunctional epoxy resin can also be present in a solution or emulsion, with the diluent being water, an organic solvent, or a mixture thereof.

Miscellaneous Additives

Compositions of the present invention can be used to produce various articles of manufacture. Depending on the requirements during the manufacturing of or for the end-use application of the article, various additives can be employed in the formulations and compositions to tailor specific properties. These additives include, but are not limited to, solvents (including water), accelerators, plasticizers, fillers, fibers such as glass or carbon fibers, pigments, pigment dispersing agents, rheology modifiers, thixotropes, flow or leveling aids, surfactants, defoamers, biocides, or any combination thereof. It is understood that other mixtures or materials that are known in the art can be included in the compositions or formulations and are within the scope of the present invention.

Articles

The present invention also is directed to articles of manufacture comprising the compositions disclosed herein. For example, an article can comprise an amine-epoxy composition which comprises the reaction product of a curing agent composition and an epoxy composition. The curing agent composition can comprise the contact product of at least one multifunctional amine having 3 or more active amine hydrogens and the benzylated APADA. The epoxy composition can comprise at least one multifunctional epoxy resin. Optionally, various additives can be present in the compositions or formulations used to produce fabricated articles, dependent upon the desired properties. These additives can include, but are not limited to, solvents (including water), accelerators, plasticizers, fillers, fibers such as glass or carbon fibers, pigments, pigment dispersing agents, rheology modifiers, thixotropes, flow or leveling aids, surfactants, defoamers, biocides, or any combination thereof.

Articles in accordance with the present invention include, but are not limited to, a coating, an adhesive, a construction product, a flooring product, or a composite product. Coatings based on these amine-epoxy compositions can be solvent-free or can contain diluents, such as water or organic solvents, as needed for the particular application. Coatings can contain various types and levels of pigments for use in paint and primer applications. Amine-epoxy coating compositions comprise a layer having a thickness ranging from 40 to 400 μm (micrometer), preferably 80 to 300 μm, more preferably 100 to 250 μm, for use in a protective coating applied on to metal substrates. In addition, for use in a flooring product or a construction product, coating compositions comprise a layer having a thickness ranging from 50 to 10,000 μm, depending on the type of product and the required end-properties. A coating product that delivers limited mechanical and chemical resistances comprises a layer having a thickness ranging from 50 to 500 μm, preferably 100 to 300 μm; whereas a coating product such as for example a self-leveling floor that delivers high mechanical and chemical resistances comprises a layer having a thickness ranging from 1,000 to 10,000 μm, preferably 1,500 to 5,000 μm.

Numerous substrates are suitable for the application of coatings of this invention with proper surface preparation, as is well known to one of ordinary skill in the art. Such substrates include, but are not limited to, concrete and various types of metals and alloys, such as steel and aluminum. Coatings of the present invention are suitable for the painting or coating of large metal objects or cementitious substrates including ships, bridges, industrial plants and equipment, and floors.

Coatings of this invention can be applied by any number of techniques including spray, brush, roller, paint mitt, and the like. In order to apply very high solids content or 100% solids coatings of this invention, plural component spray application equipment can be used, in which the amine and epoxy components are mixed in the lines leading to the spray gun, in the spray gun itself, or by mixing the two components together as they leave the spray gun. Using this technique can alleviate limitations with regard to the pot life of the formulation, which typically decreases as both the amine reactivity and the solids content increases. Heated plural component equipment can be employed to reduce the viscosity of the components, thereby improving ease of application.

Construction and flooring applications include compositions comprising the amine-epoxy compositions of the present invention in combination with concrete or other materials commonly used in the construction industry. Applications of compositions of the present invention include, but are not limited to, its use as a primer, a deep penetrating primer, a coating, a curing compound, and/or a sealant for new or old concrete, such as referenced in ASTM C309-97, which is incorporated herein by reference. As a primer or a sealant, the amine-epoxy compositions of the present invention can be applied to surfaces to improve adhesive bonding prior to the application of a coating. As it pertains to concrete and cementitious application, a coating is an agent used for application on a surface to create a protective or decorative layer or a coat. Crack injection and crack filling products also can be prepared from the compositions disclosed herein. Amine-epoxy compositions of the present invention can be mixed with cementitious materials such as concrete mix to form polymer or modified cements, tile grouts, and the like. Non-limiting examples of composite products or articles comprising amine-epoxy compositions disclosed herein include tennis rackets, skis, bike frames, airplane wings, glass fiber reinforced composites, and other molded products.

In a particular use of the invention these curing agent compositions will have applicability in making epoxy filament-wound tanks, infusion composites such as windmill blades, aerospace adhesives, industrial adhesives, as well as other related applications. A composite is a material made of different substances, and in the case of resin technologies, composites refer to resin impregnated systems where the resin is reinforced by the addition of reinforcing materials such as fillers and fibers for improving general properties of the resulting product. These materials work together but are not soluble in one another. In the present case, the binder component comprises the epoxy resin and epoxy curing agent(s). There are many types of composite applications such as prepegs, laminates, filament windings, braiding, pultrusion, wet lay and infusion composites. Resin infusion, or resin transfer, is a process by which resin is introduced to the composite mold, the reinforcement material having already been placed into the mold and closed prior to resin introduction. There are variations on this process such as those that are vacuum assisted.

An advantage of the use of benzylated APADA in amine-epoxy compositions for making composites is the longer pot life and improved compatibility versus the unmodified aliphatic polyamines like TETA. The short pot life of unmodified aliphatic polyamines like TETA make them barely workable for filament winding and infusion applications. Curing agents like TETA start to cure before the processing is completed, leading to poor wet out and dry spots that are failure points. TETA is used for hand lay-up composites where long pot life is not needed, but generally not for resin infusion. Using TETA for filament winding (pipes) is a very manual process with significant EH&S concerns (the TETA and epoxy resin is mixed, then the workers take cups of the mixture from a dispenser and manually pour them over the winding glass fibers and run their gloved hands along the pipe to run the liquid onto the winding pipe). With longer pot life the process could be automated with a bath.

The advantage in adhesives is again longer pot life, in this case so there is no skin-over before the parts are glued together, which is a major concern for large aircraft and windmill blades, when it takes a long time to place the adhesive beads across the entire part. Lower blush due to the benzyl group adds to the lower skin-over. The low viscosity allows for high filler levels. If the adhesive that is put on the part first starts to cure or starts to blush over before the last of the adhesive is dispensed on the part, when the two pieces are pressed together there will be a weaker bond with the first bead.

After heat cure the benzylated curing agents of the invention show good physical properties, comparable to amines like isophoronediamine (IPDA) which are used in composites for mechanical strength and compatibility with epoxy resin (see table below). However, these benzylated APADA curing agents are lower Tg than IPDA so do not need as extensive a cure time/temperature in order to fully cure, so processing should be lower cost. Like many amine-cured epoxy formulations, IPDA-Epon 828 is known to be brittle when it does not fully cure, which is one of the reasons why formulators use high levels of plasticizers (benzyl alcohol) with IPDA in room-temperature cure coatings and why IPDA needs to be fully cured in composite applications.

Example 1

Synthesis of Aminopropylated Ethylenediamine (APEDA)

The synthesis of aminopropylated ethylenediamine (APEDA) is a two step process. The first step involves the cyanoethylation of ethylenediamine (EDA) and the second step is the hydrogenation of cyanoethylated EDA to APEDA.

Step 1. EDA (1803 g) was charged to a 2 gal (7.56 L) reactor with 249.4 g of water. The reactor was filled with 50 psig (4.4 atm) nitrogen, stirred for 30 sec and depressurized. This process was repeated 3× to remove all air from the reactor. After the final nitrogen purge, the reactor was filled with a nitrogen atmosphere and 3184 g of acrylonitrile was added using a high pressure liquid pump over 4 hr at 70° C. After the addition was complete the reactor temperature was maintained at 70° C. for an additional 30 min for the reaction to complete to afford di-cyanoethylated EDA.

Step 2: A 2 gal (7.56 L) Parr pressure reactor was charged with 785 g of isopropanol and 78 g of Raney Cobalt #2724 sponge metal catalyst. The reactor was sealed and pressure cycled 3× with nitrogen to remove air and 3× with hydrogen to remove the nitrogen. The vessel was then heated to 120° C. and pressurized to 800 psig (55.4 atm) with hydrogen. A total of 4200 g of di-cyanoethylated EDA from Step 1 was then added to the reactor in 4 hr at 120° C. using a high pressure liquid pump. The reactor contents were then kept for additional 90 min to complete the hydrogenation. After this 90 min post hydrogenation period the reactor was depressurized and the product was cooled down to 40° C. and filtered. This product was further processed in a rotary evaporator at 100-120° C. and 30-10 mm Hg to remove isopropanol, light components, and any residual water. The recovered product Am3-Am5 contained 2.3 wt % mono-aminopropylated EDA (Am3); 86.6% di-aminopropylated EDA (Am4); and 5.5 wt % tri-aminopropylated EDA (Am5). Table 1 also shows the viscosity, AHEW, amine values and pot life/gel time of the recovered product. The pot life/gel time was run on a 150 g mass comprising the amine curing agent composition mixed stoichiometrically with Epon 828 resin, a standard bisphenol-A based epoxy resin (DGEBA, EEW=190), and measured with a Techné gel timer at 25° C.

TABLE 1

| APEDA | |
|---|---|
| Example | 1 |
| Amine used | EDA |
| Amine ratio/ACN | 2/1 |
| Isopropanol (g) | 785 |
| Cyanoethylated Amine quantity (g) | 4200 |
| Raney Co #2724 catalyst (g) | 78 |
| % Di-aminopropylated amine | 86.6 |
| Viscosity at 25° C. (mPa · s) | 25.9 |
| AHEW | 29 |
| Actual Amine value (mg KOH/g) | 1273 |
| Gel time at 25° C. (min) | 39 |

Example 2

Synthesis of Benzylated APEDA (Am3-Am5) Mixture at a 1.2:1 Molar Ratio

A 1 L Parr pressure reactor was charged with 435.8 g of APEDA mixture from Example 1 and 6.5 g of 5% palladium on carbon catalyst. The reactor was sealed and pressure cycled 3× each with nitrogen to remove air and hydrogen to remove the nitrogen. The vessel was then depressurized and maintained under an atmosphere of hydrogen. A total of 344.8 g of benzaldehyde was then added to the reactor at a rate that took 10-20 min to complete using a high pressure metering pump. The temperature was stabilized at 80° C. and the hydrogen pressure was increased to 120 psig (9.2 atm) with hydrogen. These conditions were maintained for 75 min, when the temperature was then increased to 120° C. and the pressure to 800 psi (55.4 atm) for an additional 90 min.

The reactor was depressurized and the product was cooled down to 40° C. and filtered. This product was further processed in a rotary evaporator at 100-120° C. and 30-10 mm Hg to remove light components and any residual water.

The recovered product contained 53.4 wt % of mono-benzylated APEDA, 41 wt % di-benzylated APEDA and no detectable tri-benzylated APEDA.

Example 3

Synthesis of Benzylated APEDA Mixture at a 2.0:1 Molar Ratio

The procedure of Example 2 was followed using 352.2 of APEDA mixture form Example 1 and 5.3 g of 5% palladium on carbon catalyst and 424.5 g of benzaldehyde except that after the benzaldehyde addition The temperature was stabilized at 80° C. and the hydrogen pressure was increased to 120 psig (9.2 atm) with hydrogen and maintained at these conditions for 180 min.

The recovered product contained 9.7% of mono-benzylated APEDA and 85.2% di-benzylated APEDA and no detectable tri-benzylated APEDA. The gel times in Table 2 were determined following the procedure stated in Example 1.

TABLE 2

| Synthesis of Benzylated (Am3-Am5) APEDA | | |
|---|---|---|
| Example | 2 | 3 |
| Amine(s) used | Am3-Am5 | Am3-Am5 |
| Benzylating agent | Benzaldehyde | Benzaldehyde |
| Degree of benzylation | 1.2/1.0 | 2.0/1.0 |
| Amine quantity (g) | 484 | 352.2 |
| Benzylating agent (g) | 344.8 | 424.5 |
| Pd/C catalyst (g) | 6.5 g | 5.3 g |
| % mono benzylated | 53.4 | 9.7 |
| % di benzylated | 41 | 85.2 |
| Viscosity at 25° C. (mPa · s) | 68 | 123 |
| AHEW | 61 | 87.5 |
| Actual Amine value (mg KOH/g) | 764 | 641 |
| Gel time (min) | 83 | 100 |

Examples 4-6

Coatings Prepared from Benzylated APEDA-Epoxy Compositions

Table 3 summarizes the amine-epoxy compositions used in Examples 4-6. For instance, the composition of Example 4 was 100 g of Epikote 828 epoxy resin, and 15.3 g of the curing agent composition of Example 1. As indicated in Table 1, Example 1 was a curing agent composition comprising the reaction product of EDA with acrylonitrile followed by reductive hydrogenation. The curing agents and their respective quantities shown in Examples 4-6 were used as per Tables 3 and 4.

Comparing the viscosities of the curing agents from Tables 1 and 2 it can be seen benzylation with benzaldehyde increased the viscosity of the aminopropylated amine. (See Examples 1-3). With regard to pot life, benzylation doubled the pot life.

Table 3 shows that benzylation had a favorable influence on the degree of cross-linking of the resin increasing it by as much as 20%. As would be expected the Tg was lower as the molecules were bigger and contained less reactive sites. A flexibilizing effect was encountered.

Drying times for the amine-epoxy compositions are summarized in Table 4. The drying time was determined at 23° C. and 65% relative humidity (RH) using a Beck-Koller recorder, in accordance with ASTM D5895, phase 3. The procedure involved coating glass panels with the amine-epoxy compositions at approximately 6 mils wet film thickness. The selection of a coating composition with either a long or short drying time depends upon the requirements of the end-use application. Generally, the results in Table 3 indicated that the coatings of inventive Examples 5 and 6 had various drying times depending on the degree of benzylation used Table 4 also lists the Persoz Hardness test results after 1 day, 3 days, and 7 days, respectively, at 23° C. and 50% RH. Coatings were applied to glass panels at a wet film thickness of about 8 mils and tested in accordance with ISO 1522. As shown in Table 4, the formulations of inventive Examples 5 and 6 having been benzylated had an higher Persoz than the original aminopropylated amine.

Additionally, the coatings of inventive Examples 5 and 6 had much faster hardness development than the aminopropylated example.

Table 4 lists the 200 Gloss test results after 1 day, 3 days, and 7 days, respectively, at 23° C. and 50% RH. Results shown are the average of 10 measurements. Coatings were applied to glass panels at a wet film thickness of about 8 mils and tested in accordance with ASTM D523. The gloss was measured at an angle of 20° using a Gardner gloss meter. Measurements were made with the glass panel placed on a black cardboard background. As shown in Table 4, each of the formulations of inventive Examples 5 and 6 had a high gloss value, this is due to the good miscibility of the curing agent with the resin.

TABLE 3

Epoxy systems DSC results and some properties.

| Example | 4 | 5 | 6 |
| --- | --- | --- | --- |
| Curing agent (Ex) | 1 | 2 | 3 |
| Weight Curing agent (g) | 15.3 | 32.2 | 461 |
| Resin weight (g) | 100 | 100 | 100 |
| Tg through DSC (° C.) init. | 135 | ND | 74 |
| After 1 day | 131 | 89 | ND |
| After 7 days | 123 | 89 | 78 |
| % Cure (DSC) after 1 day | 72.4 | 72 | 73 |
| After 7 days | 84.1 | 84 | 88 |
| Peak exotherm (° C.) | 103 | 112 | 115 |

TABLE 4

Coating properties

| Example | 4 | 5 | 6 |
| --- | --- | --- | --- |
| Curing agent (Ex) | 1 | 2 | 3 |
| Weight Curing agent (g) | 15.3 | 32.2 | 46.1 |
| Resin weight (g) | 100 | 100 | 100 |
| TFST @ 25° C. | | | |
| Phase 1 | 120 | 105 | 180 |
| Phase 2 | 180 | 150 | 330 |
| Phase 3 | 255 | 225 | 375 |
| Phase 4 | >24 hours | 270 | 900 |
| TFST @ 5° C. | | | |
| Phase 1 | ND | 465 | 345 |
| Phase 2 | ND | 660 | 455 |
| Phase 3 | ND | 720 | 540 |
| Phase 4 | ND | >24 hours | 945 |

TABLE 4-continued

Coating properties

| Example | 4 | 5 | 6 |
| --- | --- | --- | --- |
| Persoz Hardness | | | |
| 1 day | 114 | 364 | 376 |
| 3 days | 137 | 360 | 391 |
| 7 days | 138 | 380 | 391 |
| Gloss after | | | |
| 1 day | 60 | 174 | 177 |
| 3 days | 35 | ND | ND |
| 7 days | 20 | ND | ND |
| Impact resistance - Direct (inch-pounds after 7 days) | ND | 8 | 20 |
| Impact resistance - Reverse (in/lbs after 7 | ND | <4 | <4 |

Example 7

This example evaluated the use of benzylated amine curing agents according to the invention for epoxy adhesives. A 2K epoxy adhesive system was formulated using industry standard amine curing agent TETA and di-benzylated Am3-Am5 curing agent of the present invention.

Pot life/gel time comparisons for TETA and the primarily dibenzylated APEDA mixture of Example 3 are shown below in Table 5. The pot life/gel time was run on a 150 g mass comprising the amine curing agent composition mixed stoichiometrically with standard bisphenol-A based epoxy resin (DGEBA, EEW=190) and measured with a Techné gel timer at 25° C.

TABLE 5

| | TETA | DiBz Am3-Am5 |
| --- | --- | --- |
| Gel time (min, 150 g mass) | 41 | 100 |

For 2K adhesives, improving pot life vs. TETA-based adhesives is attractive while maintaining physical properties because the long pot life allows sufficient working time to apply the adhesive beads to multiple points on large composite structures that need to be glued together. The key to a long open time in an adhesive is long pot life to ensure minimal cure during the open time, but also minimal blush to prevent skin-over which can significantly weaken the adhesive bond. This is noticeable in large parts where the bond from the first-applied adhesive bead is weaker than the bond from the last-applied adhesive bead, and creates a weak point in the part.

Various amine curing agents were mixed stoichiometrically with standard bisphenol-A based epoxy resin (DGEBA, EEW=190) and coated on cold-rolled steel plates at a 2 mil thickness. Panels were cured at room temperature and evaluated at 2 days and 7 days. An Elcometer blush test kit used according to the kit instructions and pH surface were measured. Blush resistance ratings are shown in the following Table 6.

TABLE 6

|  | TETA | IPDA | Am3-Am5 Ex 1 | Bz-Am3-Am5 Ex 2 | DiBz-Am3-Am5 Ex 3 |
|---|---|---|---|---|---|
| Blush rating* | 4 | 2 | 5 | 4 | 1 |
| Surface pH | 9 | 7 | 10 | 9 | 7 |

*Blush scale:
0 = No blush
1 = Slight blush - Detectable with test kit, coating appearance is clean and clear
2 = Some blush - Detectable with test kit, result is bluer on filter paper
3 = Moderate blush - Detectable with test kit, slight film can be felt on surface
4 = Severe blush - Highly detected with kit, coating is cloudy and greasy feeling
5 = Extreme blush - Highly detected with kit, coating is opaque and sticky
Analysis done with Elcometer Blush Test kit used according to test instructions.

The dibenzylation dramatically improved the blush of these amines and the resulting adhesives, offering a performance advantage over standard aliphatic amines and even some standard cycloaliphatic amines. Neutral surface pH (7) supports that there is little free amine on the surface even when not seen as surface blush.

Example 8

This example evaluates the use of benzylated amine curing agents according to the invention for filament wound composite applications.

In composites, long pot life is key to proper infusion, filament winding and fiber wetting. In addition, composites have been shown to absorb water in greater quantities than the steel structures they are replacing. If this water is released it can cause failures along the adhesive bond between two structures or affect the integrity of the composite structure itself. Cured resin systems with lower water absorption while maintaining pot life and physical properties would be a performance improvement and advantage. Water absorption testing was done based on the following protocols:

Castings were made in aluminum molds, ⅛ in (3.18 mm) thick. The cure schedule for the test materials was 35 minutes at 54° C. followed by 2 hours at 121° C. Castings were then cut to the dimensions of 1"×3" (2.54×7.62 cm). Initial weights, Shore D hardness and Tg onset temperatures were taken. Samples were submerged in DI water at 66° C. and evaluated for change in weight, change in Shore D hardness and change in Tg onset temperature over time.

In wind composites, a standard formulation is a blend of IPDA and D230. D230 is present primarily to improve pot life and moderate cost. In filament winding, a number of poly (alkyleneoxide) polyamines (D230, T403, etc.) are used as sole curing agents or blended with other amines again for cost and pot life reasons. These polyamines have the disadvantage of absorbing water, and so do standard aliphatic amines like TETA. This leads to lower glass transition temperatures and the integrity concerns as described above. The benzylated amines address this water absorption issue, as is shown below in Table 7, while offering pot life extension and maintaining physical properties.

TABLE 7

|  | TETA | IPDA | D230 | Am3-Am5 Ex 1 | Bz-Am3-Am5 Ex 2 | DiBz-Am3-Am5 Ex 3 |
|---|---|---|---|---|---|---|
| Hardness, initial (D) | 87 | 86 | 84 | 85 | 86 | 84 |
| Hardness, 1 wk. | 86 | 86 | 81 | 84 | 84 | 83 |
| Hardness, 2 wk. | 86 | 87 | 82 | 83 | 84 | 82 |
| Tg, initial (° C.) | 127 | 134 | 84 | 132 | 86 | 65 |
| Tg, 1 week water exp. | 99 | 121 | 68 | 87 | 80 | 60 |
| % change in Tg after 65° C. water exposure | 22 | 10 | 19 | 34 | 7 | 8 |
| % water absorption |  |  |  |  |  |  |
| 1 week | 1.7% | 1.4% | 2.2% | 1.9% | 1.4% | 1.4% |
| 2 weeks | 2.3% | 1.6% | 2.5% | 2.4% | 1.9% | 1.7% |

The invention claimed is:

1. A composition comprising: at least one benzylated aminopropylated alkylenediamine having a formula:

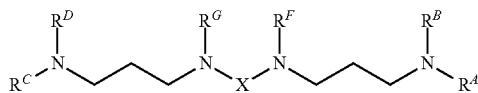

wherein $R^A$ is a substituted or unsubstituted benzyl group; $R^B$, $R^C$, $R^D$, $R^F$, and $R^G$ are independently $R^A$ or a hydrogen atom; X is a C2-C6 alkylene group, provided that the benzylated aminopropylated alkylenediamine has at least three active amine hydrogen atoms; and at least one multifunctional amine comprising at least one member selected from the group consisting of ethylenediamine (EDA), diethylenetriamine (DETA), triethylenetetramine (TETA), tetraethylenepentamine (TEPA), pentaethylenehexamine (PEHA), propylenediamine, dipropylenetriamine, tripropylenetetramine, N-3-aminopropyl ethylenediamine (Am3), N,N'-bis(3-aminopropyl)ethylenediamine (Am4), N,N,N'-tris(3-aminopropyl)ethylenediamine (Am5), N-3-aminopropyl-1,3-diaminopropane, N,N'-bis(3-aminopropyl)-1,3-diaminopropane, N,N,N'-tris(3-aminopropyl)-1,3-diaminopropane, and any combination thereof.

2. The composition of claim 1 wherein $R^A$ and $R^C$ are benzyl or vanillyl; and $R^B$, $R^D$, $R^F$, and $R^G$ are hydrogen atoms.

3. The composition of claim 1, wherein X is ethylene.

4. An amine-epoxy composition comprising the reaction product of:
A) a curing agent comprising the composition of claim 1; and
B) an epoxy composition comprising at least one multifunctional epoxy resin.

5. An article of manufacture comprising the composition of claim 4.

6. The article of claim 5, wherein the article is an adhesive, a coating, a primer, a sealant, a curing compound, a construction product, a flooring product, or a composite product.

7. A composition comprising: at least one benzylated aminopropylated alkylenediamine having at least three active amine hydrogen atoms; and at least one multifunctional amine;
wherein the at least one benzylated aminopropylated alkylenediamine comprises: an alkylenediamine structure having two nitrogen atoms; at least one aminopropyl group bonded to at least one of the nitrogen atoms of the alkylenediamine structure; and at least one substituted or unsubstituted benzyl group bonded to the nitrogen atom of at least one aminopropyl group of the at least one aminopropyl group bonded to at least one of the nitrogen atoms of the alkylenediamine structure; and
wherein the at least one multifunctional amine comprises at least one member selected from the group consisting of ethylenediamine (EDA), diethylenetriamine (DETA), triethylenetetramine (TETA), tetraethylenepentamine (TEPA), pentaethylenehexamine (PEHA), propylenediamine, dipropylenetriamine, tripropylenetetramine, N-3-aminopropyl ethylenediamine (Am3), N,N'-bis(3-aminopropyl)ethylenediamine (Am4), N,N,N'-tris(3-aminopropyl)ethylenediamine (Am5), N-3-aminopropyl-1,3-diaminopropane, N,N'-bis(3-aminopropyl)-1,3-diaminopropane, N,N,N'-tris(3-aminopropyl)-1,3-diaminopropane, and any combination thereof.

8. The composition of claim 7, wherein the composition has an amine hydrogen equivalent weight (AHEW) based on 100% solids from about 50 to about 500.

9. The composition of claim 7, wherein the composition has an AHEW based on 100% solids from about 100 to about 200.

10. The composition of claim 7 wherein at least 20 wt. % of the benzylated aminopropylated alkylenediamine have at least two benzyl groups.

11. The composition of claim 7 wherein the multifunctional amine comprises ethylenediamine (EDA).

12. The composition of claim 7 wherein the multifunctional amine comprises triethylenetetramine (TETA).

13. The composition of claim 7 wherein the multifunctional amine comprises N-3-aminopropyl ethylenediamine (Am3).

14. The composition of claim 7 wherein the multifunctional amine comprises N,N'-bis(3-aminopropyl)ethylenediamine (Am4).

15. The composition of claim 7 wherein the multifunctional amine comprises N,N,N'-tris(3-aminopropyl)ethylenediamine (Am5).

16. The composition of claim 7 wherein the at least one benzylated aminopropylated alkylenediamine comprises the reaction product of a benzyl halide compound with at least one aminopropylated alkylenediamine.

17. The composition of claim 1 wherein the at least one benzylated aminopropylated alkylenediamine comprises the reductive amination product of a benzaldehyde compound with at least one aminopropylated alkylenediamine.

18. The composition of claim 17, wherein the at least one aminopropylated alkylenediamine compound is N-3-aminopropyl ethylenediamine (Am3); N,N'-bis(3-aminopropyl)ethylenediamine (Am4); N,N-bis(3-aminopropyl)ethylenediamine; N,N,N'-tris(3-aminopropyl)ethylenediamine (Am5); N,N,N',N'-tetrakis(3-aminopropyl)ethylenediamine; N-3-aminopropyl-1,3-diaminopropane; N,N'-bis(3-aminopropyl)-1,3-diaminopropane; N,N-bis(3-aminopropyl)-1,3-diaminopropane; N,N,N'-tris(3-aminopropyl)-1,3-diaminopropane; N,N,N',N'-tetrakis(3-aminopropyl)-1,3-diaminopropane or any combination thereof.

19. The composition of claim 17, wherein the at least one aminopropylated alkylenediamine compound is N-3-aminopropyl ethylenediamine (Am3); N,N'-bis(3-aminopropyl)ethylenediamine (Am4); N,N-bis(3-aminopropyl)ethylenediamine; N,N,N'-tris(3-aminopropyl)ethylenediamine (Am5) or any combination thereof.

20. The composition of claim 17, wherein the molar reactant ratio of the benzaldehyde compound to the at least one aminopropylated alkylenediamine compound is in a range from about 0.8:1 to about 2:1.

21. The composition of claim 17, wherein the molar reactant ratio of the benzaldehyde compound to the at least one aminopropylated alkylenediamine compound is in a range from about 1.2:1 to about 1.5:1.

22. An amine-epoxy composition comprising the reaction product of:
A) ring agent comprising the composition of claim 17; and
B) an epoxy composition comprising at least one multifunctional epoxy resin.

23. An amine-epoxy composition comprising the reaction product of:
A) ring agent comprising the composition of claim 7; and
B) an epoxy composition comprising at least one multifunctional epoxy resin.

24. The composition of claim 23, wherein the stoichiometric ratio of epoxy groups in the epoxy composition to amine hydrogens in the curing agent composition is in a range from about 1.3:1 to about 0.7:1.

25. An article of manufacture comprising the composition of claim 23.

26. The article of claim 25, wherein the article is an adhesive, a coating, a primer, a sealant, a curing compound, a construction product, a flooring product, or a composite product.

27. The article of claim 26, wherein the article is a coating, primer, sealant, or curing compound which is applied to a metal or cementitious substrate.

\* \* \* \* \*